United States Patent [19]
Christian et al.

[11] Patent Number: 5,774,815
[45] Date of Patent: Jun. 30, 1998

[54] DRY HALIDE METHOD FOR SEPARATING THE COMPONENTS OF SPENT NUCLEAR FUELS

[75] Inventors: Jerry Dale Christian, Idaho Falls; Thomas Russell Thomas, Rigby; Glen F. Kessinger, Idaho Falls, all of Id.

[73] Assignee: The United States of America as represented by the United States Department of Energy, Washington, D.C.

[21] Appl. No.: 696,187

[22] Filed: Aug. 13, 1996

[51] Int. Cl.$^6$ .................................................. G21F 9/00
[52] U.S. Cl. ................................... 588/18; 95/42; 588/19
[58] Field of Search .................. 588/1, 18, 19; 110/237; 95/42

[56] References Cited

U.S. PATENT DOCUMENTS

| | | | |
|---|---|---|---|
| 4,952,339 | 8/1990 | Temus et al. | 252/632 |
| 5,202,100 | 4/1993 | Nagel | 423/5 |
| 5,252,258 | 10/1993 | Ohtsuka et al. | 252/638 |
| 5,336,450 | 8/1994 | Ackerman et al. | 423/21.1 |
| 5,424,042 | 6/1995 | Bradley | 422/159 |

OTHER PUBLICATIONS

A Dry Chloride Volatility Concept for Processing Spent Nuclear Fuels, Jerry D. Christian, Thomas R. Thomas and Glen F. Kessinger—Aug. 14–18 1994 15 pages.

Primary Examiner—Ngoclan Mai
Attorney, Agent, or Firm—Timothy Harney; Mark P. Dvorscak; William R. Moser

[57] ABSTRACT

The invention is a nonaqueous, single method for processing multiple spent nuclear fuel types by separating the fission- and transuranic products from the nonradioactive and fissile uranium product. The invention has four major operations: exposing the spent fuels to chlorine gas at temperatures preferably greater than 1200° C. to form volatile metal chlorides; removal of the fission product chlorides, transuranic product chlorides, and any nickel chloride and chromium chloride in a molten salt scrubber at approximately 400° C.; fractional condensation of the remaining volatile chlorides at temperatures ranging from 164° C. to 2° C.; and regeneration and recovery of the transferred spent molten salt by vacuum distillation. The residual fission products, transuranic products, and nickel- and chromium chlorides are converted to fluorides or oxides for vitrification. The method offers the significant advantages of a single, compact process that is applicable to most of the diverse nuclear fuels, minimizes secondary wastes, segregates fissile uranium from the high level wastes to resolve potential criticality concerns, segregates nonradioactive wastes from the high level wastes for volume reduction, and produces a common waste form glass or glass-ceramic.

19 Claims, 3 Drawing Sheets

DRY HALIDE METHOD FOR SEPARATING THE COMPONENTS OF SPENT NUCLEAR FUELS

CONTRACTURAL ORIGIN OF THE INVENTION

The United States Government has rights in this invention pursuant to Contract No. DE-AC07-94ID13223 between the U.S. Department of Energy and Lockheed Idaho Technologies Company.

BACKGROUND OF THE INVENTION

In 1992, the Department of Energy (DOE) discontinued reprocessing of spent nuclear fuels at the Idaho National Engineering Laboratory's (INEL) Idaho Chemical Processing Plant (ICPP) for recovery of enriched uranium. A major part of the prior mission of the ICPP associated with the fuel reprocessing was receipt and interim storage of spent naval fuels that were used to propel the Navy's ships and submarines. It was necessary for that part of the mission to continue so that the Navy's nuclear fleet could still be operated. As part of an agreement with the Governor of Idaho to allow continued receipt and storage of the fuels in the absence of reprocessing, DOE established a development program with Westinghouse Idaho Nuclear Company, the predecessor contractor to Lockheed, for technologies to condition all radioactive wastes and spent fuels at the INEL for ultimate disposal at Federal repositories.

INEL has over 90 fuel types in approximately 25 chemical categories. By the year 2038, more than 5700 tons must be dispositioned. If they were canned directly, a minimum of 3475 canisters would be produced. Disposal costs would be in the order of $1.4 billion. Characterization and qualification of each high level waste form for disposal at Yucca Mountain costs $200 million. Conservatively, a series of similar types beyond the first run, such as the fuels, might cost $60 million each. Total qualification costs could be $1.6 billion. Most of the spent fuels at the ICPP contain highly enriched uranium that may impact direct disposal because of long term criticality issues.

The fuels also have major quantities of non-radioactive constituents that contribute substantially to the volume of high level waste (HLW) canisters that would have to be disposed. These non-radioactive components, usually in an alloy form with uranium, cannot be segregated from the radionuclides by normal aqueous processing methods. The Zircaloy-based naval fuels, for example, contain about three weight per cent fission products and transuranic products and unburned uranium, and aluminum fuels contain 4.5% fission products and transuranic products and 8.9% uranium. If the non-radioactive components could be segregated as low level waste, the high level waste volume could be decreased by a factor of approximately 40 relative to direct canning (glass ceramic HLW vs. fuel with voids in the canisters).

Currently, methods for extracting radioactive components from spent nuclear fuel require aqueous processing. This method is novel in that it does not require the fuel to be dissolved nor does it require various liquid - liquid extraction steps. The use of conventional aqueous processing would result in approximately six to eight different dissolution head-end facilities. The facilities would cost $3 billion versus $0.6 billion for the single dry halide processing facility. The aqueous process would not segregate the non-radioactive components from the HLW and would produce approximately 4590 canisters for disposal. In the present method the dry fuels are reacted with chlorine gas saving not only process steps but also decreasing the chance that contaminates could be released to the environment. The invention offers the significant advantages of a single, compact method that is applicable to most of the diversity of fuels and that would minimize secondary wastes, segregate major non-radioactive components from the HLW for volume reduction, segregate fissile uranium from the HLW to resolve potential criticality concerns, and produce a common waste form glass or glass-ceramic.

SUMMARY OF THE INVENTION

It is an objective of this invention to provide a nonaqueous method for separating the components of multiple types of radionuclides, in particular the various types of spent nuclear fuels to improve the storage and waste form disposal characteristics of the fuels and to lessen the costs associated with storage and disposal.

It is an objective of the invention to separate the high level radioactive wastes from low level radioactive wastes and nonradioactive wastes.

It is an objective of this invention to separate fissile uranium from radioactive wastes.

It is an objective of the invention to provide a single separation process that is capable of processing a variety of fuel types.

It is an objective of the invention to provide a method in which the chemicals used for separating the components can be regenerated and recycled.

It is an objective of the invention to separate the fission products and transuranic wastes for vitrification and storage.

It is an objective of the invention to use a fluidized bed as a condenser as well as a means to form particles.

In brief the invention is a single method to separate multiple types of radionuclides, particular the various types of spent nuclear fuels into their components. The fission products (FP) and transuranic products (TRU) are separated from the non-radioactive and fissile products for storage and disposal. The fuels are placed in a dry reaction vessel and reacted with heated chlorine gas. The resulting metal chloride gas stream is scrubbed with molten salt to remove the high level radioactive components. The scrubbed gas stream is condensed in stages to remove the remaining components for disposal. The molten salt loaded with dissolved radioactive constitutents is transfered to a separate vessel and is volatilized to precipitate the high level wastes and recycle the salt to the scrubber. The precipitates are vitrified for long term storage and disposal.

The described dry chloride volatility processing and separation of spent fuel components is unique in the following aspects when compared to previously known methods. The high temperature volatilization enables complete volatilization of the fuel and separation of the major components from the bulk of the other groupings of components. Separation of the high level waste and transuranic components from the bulk of the other fuel components is enabled by scrubbing with molten salt. The removal of the scrub salt from the radioactive waste constituents by vacuum distillation for recovery and reuse results in reduced wastes and the ability to produce a superior waste form. Conversion of the chloride wastes to fluorides or by reaction with boric acid prior to forming a glass or glass-ceramic results in a superior waste form for repository disposal.

Other features and advantages of the invention will be apparent from the following description taken in conjunction with the accompanying drawings.

DESCRIPTION OF THE PREFERRED EMBODIMENT

Figure 1:
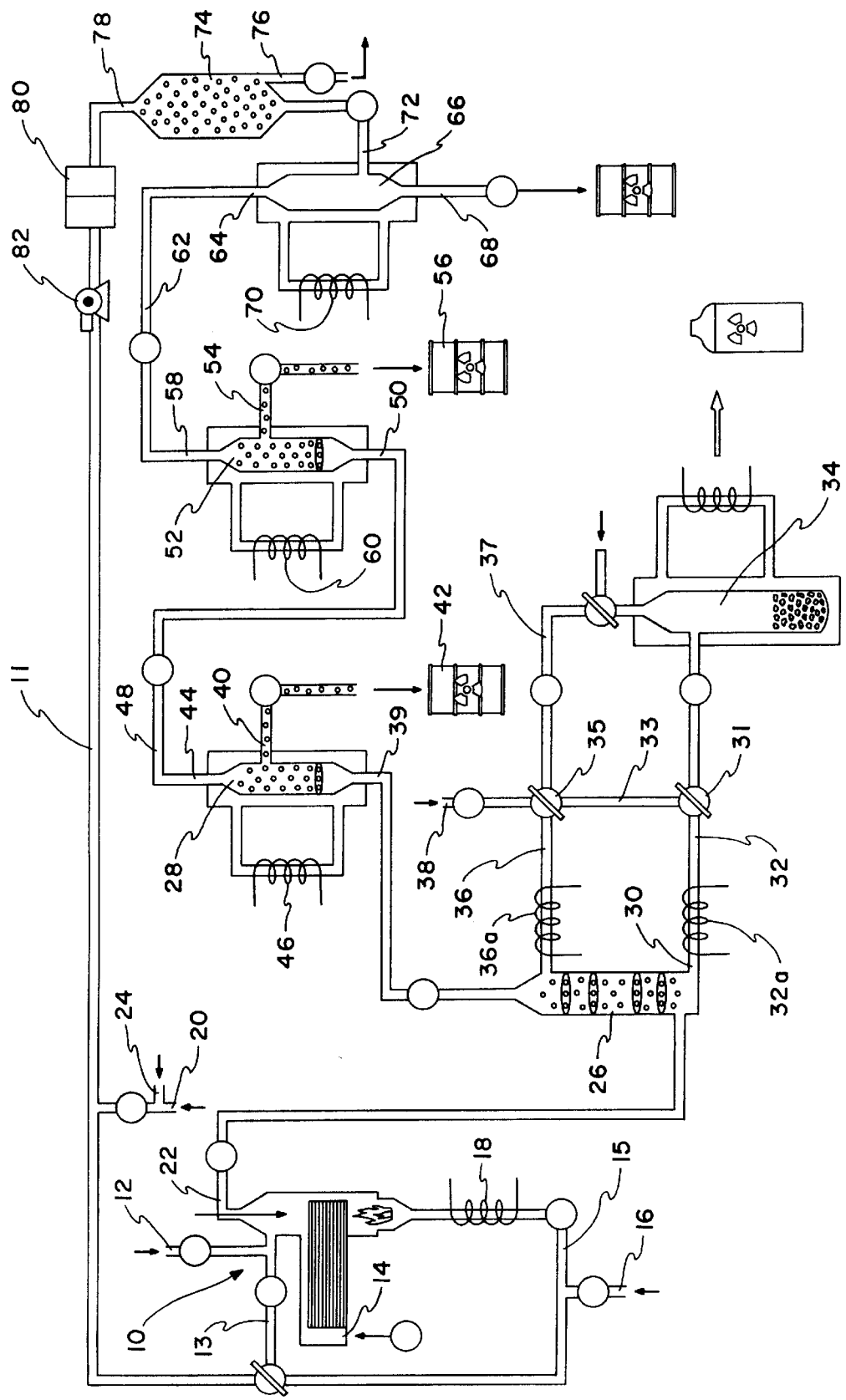
FIG. 1 is a diagram illustrating the flow of components through the invented method for the processing of Zircaloy fuels.

The invention is a nonaqueous method for reprocessing or conditioning spent nuclear fuels for disposal. It is a single process for multiple fuel types that separates the fission products and transuranic products from the nonradioactive and fissile uranium components. The fuels include Zircaloy fuels, aluminum fuels, stainless steel fuels and with an oxygen scavenger, commercial LWR oxide fuels. Graphite fuels may be processed after the graphite matrix has been burned off. The concentrated HLW radionuclides can be converted to a single glass or glass-ceramic waste form for repository disposal. The number of canisters of HLW that would require disposal could be decreased to fewer than 100.

The process offers the significant advantages of a simple, compact process that is applicable to most of the diversity of fuels and that would minimize secondary wastes, segregate major nonradioactive components from the HLW for volume reduction, segregate fissile uranium from the HLW to resolve criticality concerns, and produce a common waste form glass or glass-ceramic.

The method is based on completely volatilizing the fuel element and separating the gaseous constituents. It consists of exposing the fuel with chlorine gas at a high temperature, preferably greater than 1200° C., which causes all the fuel constituents to form volatile chlorides. The gases are then separated by molten salt scrubbing and fractional condensation. There are four major operations: chlorination and volatilization of all fuel components at about 1200° C.; removal of fission product chlorides, transuranic product chlorides, and any nickel chlorides and chromium chlorides in the $ZnCl_2$ scrubber at about 400° C.; fractional condensation at temperatures ranging between 164° C. and 2° C. of $ZrCl_4$, $FeCl_3$, $AlCl_3$, $UCl_6$, $SnCl_4$, and $I_2$ vapors which pass through the scrubber; and regeneration of the transferred spent molten salt by vacuum distillation to recover $ZnCl_2$, $ZnCl_2$, and soluble $ZrCl_4$ for recycle, leaving the fission product chlorides, transuranic product chlorides, and nickel chlorides and chromium chlorides as residue that are converted to oxides or fluorides for vitrification. Argon carrier gas and unreacted chlorine gas are recycled, the chlorine gas content adjusted, and the stream split and passed through the unit operations in a continuous closed loop. Periodic shut down of the coupled unit operations occurs for batch removal of fission product xenon and krypton gases from the carrier gas (such as by cryogenic distillation), batch transfer of the molten salt to the molten salt regenerator, and batch removal of nonradioactive components and uranium from the condensers.

It may be feasible to chlorinate the fuel at a lower temperature than 1200° C. If so some of the radionuclides, such as the transuranics may remain in the chlorinator for recovery at the end of the campaign. Chlorination directly in the molten salt is a possibility.

The small quantity of fission product HLW and transuranic product HLW is converted into a waste form for repository disposal. The conversion steps to a glass or glass-ceramic form involve fluorination at approximately 723° C. and then melting with glass frit additives or conversion to oxides by heating at about 1000° C. with boric acid followed by melting with glass frit additives. Options such as TRUEX (transuranic extraction developed by Argonne National Laboratory) could be applied to the fission product chlorides and transuranic product chlorides dissolved in 6M HCl if their separation were desired or needed prior to immobilization.

In the chlorination step, rate of reaction is controlled by the feed rate of chlorine gas and temperature is controlled by appropriate blending of an inert gas such as Ar gas with $Cl_2$. An oxygen scavenger, such as carbon monoxide, is added to prevent formation of oxychlorides when oxides are present. A carbon dioxide absorption bed in the off-gas system collects the $CO_2$ that is formed. Zinc chloride was selected for the scrubber medium because its low melting point and favorable vapor pressure permit its use to scrub the chlorinator off-gas at a low temperature, while being sufficiently volatile at 725° C. to allow evaporative separation from the radioactive waste chlorides for subsequent recycle. For fuels with Zircaloy, some $ZrCl_4$ will dissolve in the $ZnCl_2$ until saturation is reached, after which $ZrCl_4$ will pass through. The dissolved $ZrCl_4$ can be recycled with the molten salt without further complicating the flowsheet.

The invention is unique in the following aspects, when compared to previous methods. The high temperature volatilization enables complete vaporization of the fuel and separation of the major components. Separation of the HLW from the bulk of the other fuel components is enabled by scrubbing with a molten salt. The removal of the scrub salt from the radioactive waste constituents by vacuum distillation for recovery and reuse results in reduced wastes and the ability to produce a superior waste form. Conversion of the chloride wastes to fluorides or oxides prior to forming a glass or glass-ceramic results in a superior waste form for repository disposal.

FIG. 1 and the detailed description are presented for naval Zircaloy fuels because they represent the most stringent fuels in terms of general requirements for controlling heat generation and types of components that must be treated. To calculate product distributions given in the material balance flowsheet Table 3 associated with the figure and attached thereto, it was assumed that thermodynamic equilibrium would be instantaneously achieved in the chlorination reactor, that the rate of chlorination would be controlled by rate of chlorine addition to the spent fuel, and the gas-condensed phase equilibrium would exist in the downstream scrubber and condensers. It was also assumed that about ¾ of the chlorine would contact the fuel and react as it passes through the reactor. The process flowrate for sizing process equipment was based on historical and planned processing at the ICPP.

Mass balance flowsheet calculations are given for a typical composition of Zircaloy fuel that does contain some stainless steel, shown in Table 1. About 75% of the Zircaloy fuels scheduled for processing do not contain stainless steel.

TABLE 1

| Component | Mass (kg) |
| --- | --- |
| Zr | 91.958 |
| Sn | 1.356 |
| Fe | 1.115 |

TABLE 1-continued

| Component | Mass (kg) |
|---|---|
| Cr | 0.36 |
| O in Zircaloy & as film | 0.84 |
| Ni | 0.224 |
| Misc. components | 1.13 |
| B | 0.011 |
| C | 0.003 |
| Li | 0.002 |
| BOL U | 1.823 |
| FP* | 1.160 |
| TRU** | 0.01754 |
| TOTAL | 100.000 |

*Selected fission products (g total element; Ci isotope of interest): Kr(0.0166; 1.12 $^{85}$Kr), Sr(0.0398; 3255 $^{90}$Sr), I(0.00732; 0.00113 $^{129}$I), Cs(0.103; 3363 $^{137}$Cs).
**TRU (g total element; Ci): Np(9.58; 0.00754), Pu(7.88; 61.13), Am(0.0697; 0.234), Cm(0.0004; 0.38).

As illustrated by FIG. 1, the chlorination reactor 10 is charged with spent fuel through the charging port 14. Chlorine gas is injected through inlet 24 into the recycle and blend line 11 and through inlet 12 into the recycle and blend control line 13. Argon gas is initially injected through inlet 20 into the recycle and blend line 11. An oxygen scavenger is injected through inlet 16 into the reactor inlet line 15 and blended with recycled chlorine/argon gas from the recycle and blend line 11. The presence of oxygen, such as in the form of an oxygen film of Zircaloy, requires the presence of an oxygen scavenger and a minimum temperature to prevent the formation of oxychlorides of uranium. The specific minimum temperature would be determined by thermodynamic modeling and experimental testing. Potential oxygen scavengers include carbon monoxide, Mo and Nb (as powdered metals, chlorides or aerosols), elemental carbon, or any of a number of unsaturated chlorinated hydrocarbons. Initial or make up argon is injected through inlet 20. This blended gas stream is heated to 1500°–1800° K. by heater 18.

Once the chlorination reaction is initiated (by heating the reactant gas with a plasma torch or electrical heater 18) the heat of reaction should sustain the desired temperature. The reacted metal chloride gases exit from the reactor through exit port 22. About 91% of the product chlorides is $ZrCl_4$, with chlorides of Sn, Cr, Fe, Ni, and U each contributing 1–2% to the exit stream. The product flow of fuel element chloride is about 6.4% of the total gas flow, which consists primarily of Ar and excess $Cl_2$ to decouple the performance of the individual unit processes and maintain an approximate constant flowrate when fluctuations in the product flowrate occurs. The Ar serves as a heat sink in the reactor to maintain the reactor off-gas in the desired temperature range.

Makeup $Cl_2$ is added to the recycled gas at inlet 24 to recycle and blend line 11 to replace that consumed by reaction that is not provided at the inlet 12. Rate of reaction is controlled in part by splitting the recycled Ar/$Cl_2$ gas stream and feeding the appropriate amount of $Cl_2$ from line 11 to the spent fuel via reactor inlet line 15. The chlorine that is fed into the recycle control line 13 from line 11 and inlet 12 serves to complete chlorination of gas phase species not fully chlorinated by line 15.

Recycled Ar/$Cl_2$ gas and makeup $Cl_2$ are introduced to the reactor 10 at 275°–300° K. through reactor inlet line 15. To control the temperature in the reactor 10, conservative calculations assuming adiabatic reaction indicate that a mole ratio of approximately 13 Ar: 2.9 $Cl_2$: 1 Zr would be required to limit the temperature to less than 2400° K. Heat losses would still result in a somewhat lower temperature. The temperature can be controlled by a combination of Ar dilution through inlet 20, blending the dilution stream in line 13 for exiting product gases close to the reaction zone, and cooling the reactor walls. For the present flowsheet calculations, it is assumed that with wall cooling, a 10 Ar: 2.9 $Cl_2$: 1 Zr mole ratio would be adequate to limit the reaction temperature to about 2400° K. and to maintain the wall temperature at less than 2000° K. To bring the exiting metal chloride gas stream down to 1800° K. would require that the volume flowrate of line 13 be 44.5% of the exiting flowrate. Additional $Cl_2$ could be added at inlet 12 to provide sufficient excess $Cl_2$ and would provide additional cooling. A complete balance of recycle and reactant gases to result in controlled exit temperature and adequate excess $Cl_2$ requires a split between lines 13 and 15 be 1:4 and addition at inlet 12 of 2.06 kmol $Cl_2$ per 100 kg fuel. This would cool the exit stream to 1750° K.

A developmental concern is material of construction for both high temperature operation and corrosion resistance. A promising material is a high kinetic energy flame spray coated $ZrO_2$ on a substrate. This process produces a high density, high integrity bonded material and is nonreactive with $Cl_2$. Graphite is an alternative choice.

The metal chloride gas stream passes through exit line 22 to the molten salt scrubber 26 which is heated by heating system 36a. The molten salt scrubber is designed to remove fission chlorides product and transuranic chlorides to levels which make all downstream condenser products non-HLW and non-TRU wastes. It also serves as a heat sink to cool the high temperature gases, via cooling system 32a, from about 1800° K. to 673° K. The molten salt is recycled to minimize the amount of waste material generated with the HLW and TRU waste. A counter-current scrubber is indicated; however, alternative designs are being evaluated. For example, a simple bubbler in a cooled vessel may suffice. In the counter-current scrubber 26, the flow of the metal chloride gases would be through inlet 30, the molten salt scrubber 26 to the inlet 39 of the first fluidized bed condenser 28. The molten salt would flow through line 32 to valve 31, then to cross line 33, through the return and $ZnCl_2$ make up valve 35 to return line 36 and back into the top of the molten salt scrubber.

Zinc chloride was selected for the scrubber medium because its low melting point and favorable vapor pressure permit its use to scrub the metal chloride gas stream at a low temperature, 673° K. (vapor pressure 0.49 Torr), while being sufficiently volatile at 1000° K. to allow evaporative separation from the radioactive waste chlorides for subsequent recycle. The solubility limit of $ZrCl_4$ in $ZnCl_2$ is about 50 mole percent; excess $ZrCl_4$ will pass through. The addition of $ZrCl_4$ results in a mixture with improved viscosity properties as compared to pure $ZnCl_2$. It can be recycled with the molten salt without further complicating the method.

The fraction of each chloride that would pass through the molten salt scrubber 26 was calculated by ratioing the equilibrium partial pressure of the chloride at 673° K. to the equilibrium partial pressure of the chloride generated in the reactor 10 (based on processing rate and total gas flow). The results are summarized in Table 2.

TABLE 2

| Species | Partial Pressure in Chlorination Reactor (Torr) | Vapor Pressure at 673 K (Torr) | Vapor Fraction Passed Through 673 K Scrubber |
|---|---|---|---|
| $ZrCl_4$ | 44 | 5510 | 1 |
| $CrCl_3$ | 0.30 | $4.4 \times 10^{-6}$ | $1.5 \times 10^{-5}$ |
| $NiCl_2$ | 0.17 | $7.1 \times 10^{-9}$ | $4.2 \times 10^{-8}$ |
| $CsCl$ | 0.037 | $2.6 \times 10^{-5}$ | $7.0 \times 10^{-4}$ |
| $SrCl_2$ | 0.019 | $4.1 \times 10^{-15}$ | $2.2 \times 10^{-13}$ |
| $PuCl_3$ | $3.2 \times 10^{-3}$ | $3.1 \times 10^{-10}$ | $9.7 \times 10^{-8}$ |
| $NpCl_4$ | $1.7 \times 10^{-3}$ | $6.1 \times 10^{-3}$ | 1 |
| $AmCl_3$ | $1.3 \times 10^{-5}$ | $3.1 \times 10^{-10}$ | $2.4 \times 10^{-5}$ |

This calculation represents maximum possible fission product and transuranic product loadings in the LLW salts collected by the condensers for purposes of conservatively estimating the classes of wastes. Solubility effects, which were ignored, may decrease equilibrium vapor pressures of dissolved species by orders of magnitude. The results show that the fractions of FP and TRU (including $NpCl_4$) which pass through the scrubber are sufficiently small to render the downstream products non-HLW and non-TRU wastes.

Saturation of the carrier gas by $ZnCl_2$ vapor was used to calculate transport of $ZnCl_2$ to the first condenser 28. The major inert (non-radioactive) chloride ($ZrCl_4$) should pass through the $ZnCl_2$ scrubber 26, other than the amount absorbed to form a binary mixture, whereas the Cr chlorides and Ni chlorides would be removed.

Once the molten salt is saturated, it may be recovered for recycle. Zinc chloride was selected for the scrubber because its melting temperature, 556° K., is well below 673° K.; its vapor pressure at 673° K. is low enough, 0.49 Torr, to minimize transport to the first condenser 28; and its boiling temperature, 1005° K., is low enough to allow separation from most of the FP chlorides and TRU chlorides for recycle. Any $ZrCl_4$, $UCl_6$, $FeCl_3$, and other low boiling point chlorides that may have partially dissolved in $ZnCl_2$ during scrubbing would also be distilled and recycled to the scrubber 26. Very small quantities of the more volatile (at 1000° K.) FP chlorides (CsCl and $RuCl_3$) could also be recycled to the scrubber 26. However, these components would achieve steady state levels such that no further net absorption of $ZrCl_4$, $UCl_6$, etc. would occur during scrubbing and that no further buildup of Cs or Ru in the scrubber would occur due to vapor phase transport during regeneration and recycle of the molten salt.

A loading of about 10 wt % of the Cr chlorides, Ni chlorides, FP chlorides, and TRU chlorides was chosen for the molten salt scrubber design before recycle. The scrubber 26 was sized for 30 days of continuous operation, i.e., with 4.5 metric tons of salt with a volume of 1600 L. A countercurrent scrubber is suggested in FIG. 1 to optimize gas-liquid contact and to expedite gas flow through the molten salt. However, gas sparging through a static scrubber is an attractive alternative due to its design simplicity.

Transfer of the spent salt to the molten salt regeneration vessel 34 via line 32 can be done through a valve 31 using gravity flow. Transport of the regenerated molten salt through recycle line 37 would be via vapor phase and condensation in the scrubber 26. Fresh $ZnCl_2$ would be added via make up line 38 to replace that lost by vapor transport to the first condenser 28 during scrubbing.

At about 1000° K., the temperature selected for vaporizing and recycling the molten salt, the Ni chlorides and Cr chlorides, as well as most of the FP chlorides and TRU chlorides, are below their melting points. These metals represent about 2.6% of the mass of the process design fuel element. To make them compatible with a glass waste form, conversion to the fluorides or oxides is necessary. Fluorination could possibly be achieved by introducing $F_2$ as a gas through the vessel to expedite mass transfer of the reactant to the solid chlorides.

The metal fluorides generally have a higher melting and boiling point than the corresponding chlorides. An extremely high temperature would be required to transport all of the fluorides, as either a melt or gas, from the vessel. For example, $SrF_2$ melts at 1746° K. and boils at 2762° K. An alternative to removing FPs and TRUs from the vessel 34 would be to accumulate sufficient wastes in the vessel from several campaigns, add molten glass to the vessel and heat the mix for the time required for dissolution and blending of the wastes into the glass. In this manner the vessel 34 would serve three unit operations functions: recycling of the molten salt, fluorination of wastes, and vitrification of the waste.

For the FP/TRU, Ni, and Cr as fluorides, a mass loading of 25 wt % in borosilicate glass is assumed. The fluoride generation rate is 2500 g/100 kg of fuel, which would yield 10,000 g of glass waste/100 kg of fuel. Assuming a glass density of 2.7 g/cm³ would result in a yield of 3.7 L of glass FP/TRU waste per 100 kg of fuel processed or 37 L per ton for those fuels that contain stainless steel. For the approximately 75% of Navy fuels that do not contain stainless steel, the quantity would be 2.2 L glass per 100 kg fuel (22 L/ton). The net average quantity would be 26 L/ton.

Instead of converting the wastes to fluorides, an alternate method would be to add boric acid to the chloride salts and heat at about 1273° K. to form the oxides that may be incorporated into a glass.

If transfer of the Ni chlorides, Cr chlorides, FP chlorides, and TRU chlorides from the vessel were determined to be the preferable option, the use of aqueous methods would probably be necessary to dissolve the chlorides. This would also place them in a state amendable for separation the TRUs from the waste using the TRUEX process.

The first condenser 28 is a fluidized-bed condenser operated in a temperature range of 425°–450° K. A fluidized-bed was selected due to its high capacity, uniform distribution of components, and its ability to cause particle growth of the components. It is believed by the inventors that the use of a fluidized-bed to condense as well as to grow particles is novel. The metal chloride gas stream enters the fluidized-bed condenser 28 through inlet port 39. The condenser recovers primarily $ZrCl_4$ along with $FeCl_3$ and volatilized $ZnCl_2$. The recovered components are removed by overflow and gravity through exit port 40 and contained in LLW waste canister 42 for disposal. A double set of series valves with a surge container between would allow for periodic removal while operating. The treated metal chloride gas stream exits through exit port 44 to transport line 48 to a second fluidized-bed condenser 52. Heat exchanger 46 removes heat from the first fluidized-bed condenser 28.

The first condenser 28 recovers primarily $ZrCl_4$ along with $FeCl_3$ and volatilized $ZnCl_2$. Based on feed rate and equilibrium vapor pressure ratios 99.4% of the $ZrCl_4$ and 75% of the $FeCl_3$ would be recovered respectively, with the remainder being recovered in the second fluidized-bed condenser 52. The mole ratio of volatilized $ZnCl_2$ to $ZrCl_4$ would be about 0.01. The partial pressure of the $UCl_6$ resulting from the feed concentration of uranium is calculated to be well below its saturation vapor pressure at 473° K., which should prevent it from co-condensing.

It is of importance that the amount of the FP chlorides and TRU chlorides passing through the molten salt scrubber 26 not cause the condenser 28 product to be classified as either greater than Class C (GTCC) waste or TRU waste. The mass ratios of HLW and TRU chlorides to the major non-radioactive chloride ($ZrCl_4$) that would collect in the first condenser 28 were calculated based on calculated fraction of the chlorides passing through the molten salt scrubber. Loadings of 39 and $2.7\times10^{-8}$ Ci/$m^3$ for $^{137}Cs$ and $^{90}Sr$ respectively would result. Both these loadings are well below the LLW limits of 4600 and 7000 Ci/$m^3$ respectively. The calculated TRU activity/mass loadings are $1.1\times10^{-2}$, 46, and $3.6\times10^{-2}$ mCi/g for Pu, Np, and Am, respectively. The only TRU which would approach the upper limit of non-TRU waste (100 nCi/g) is Np. This loading, along with all others, may be highly conservative when solubility effects of Np in the $ZnCl_2$ molten salt are taken into account or if a fluidized bed of alumina were used as an inert condensing medium in the condenser.

No additive to the $ZrCl_4/FeCl_3$ waste would be required to meet the class C waste and the waste would most likely meet the class B waste specifications. The main requirement would be that the waste form or the container must maintain its gross physical properties and identity for 300 years. The density of $ZrCl_4$ is 2.8 kg/L and the production rate of the $ZrCl_4/FeCl_3$ waste is about 1.02 kmol or 237 kg/100 kg of fuel processed, resulting in a waste volume of 85 L/100 kg fuel. If the chlorides were fixed in a 50:50 volumetric mix of wastes to concrete, the final form would be 170 L. A standard waste drum for LLW burial has a volume of 55 gallons (210 L). Therefore based on these assumptions, about one waste drum of LLW from the first condenser 28 per 100 kg of fuel would be generated. Fuels without stainless steel would yield nearly the same volume.

The second condenser 52 is also a fluidized-bed condenser. This fluidized-bed condenser 52 operates at a temperature range of 300°–325° K. The metal chloride gas stream enters the fluidized-bed condenser 52 through inlet port 50. The condenser recovers primarily $UCl_6$ at 99.8% efficiency. Residual amounts of $FeCl_3$ and $ZrCl_4$ passing through the first condenser 28 would also co-condense. The composition of the condensate would consist of about 51, 27, and 22 mole percent of U chlorides, Zr chlorides, and Fe chlorides, respectively. The FP chlorides and TRU chlorides level would be several orders of magnitude below the limits of GTCC and TRU wastes. The recovered components are removed similar to condenser 28 through exit port 54 and contained in LLW waste canister 56 for disposal. The treated metal chloride gas stream exits through exit port 58 to transport line 62 to a shell and tube condenser 66. Heat exchanger 60 removes heat from the second fluidized-bed condenser 52.

The product from the second fluidized-bed condenser 52 contains the HEU as well as chlorides of Zr and Fe (mole ratios of 0.51 U, 0.27 Zr, 0.22 Fe). HEU is subject to safeguards and criticality control considerations. The above product distribution equates to a total of $2.7\times10^{-2}$ kmol or 8.2 kg chlorides per 100 kg fuel processed. Final disposition of HEU remains unresolved in U.S. policy; therefore, no waste form is suggested for this product.

The metal chloride gas stream is transported through line 62 to shell and tube condenser 66 which is operated in a temperature range of 250°–275° K. for the purpose of removing $SnCl_4$ and $I_2$. Both of these gases would initially be below their saturation vapor pressures but would begin to build up to condensable levels within a day in the recycle $Ar/Cl_2$ gas stream 11. Without condenser 66 these gases would begin to co-condense with the $UCl_6$ product. The iodine would condense as a solid but the $SnCl_4$, which melts at 240° K., would condense as a liquid. The iodine accumulation would be only 7.7 g per 100 kg of fuel. It would be removed by sublimation from the condenser a few times during a campaign by warming the condenser and purging it. The $SnCl_4$ liquid would accumulate at a rate of 3.0 kg per 100 kg fuel and liquid would be removed approximately daily. Two condensers in parallel would enable recovery by one while the other was used for collection. The condensed $SnCl_4$ and $I_2$ are removed through exit port 68 to a LLW canister (not shown).

The condenser is cooled by heat exchanger 70. The metal chlorides have at this point effectively been removed from the $Ar/Cl_2$ gas stream. The $Ar/Cl_2$ gas stream exits condenser 66 through exit port 72. The gas stream is passed through a $CO_2$ sorption bed 74. $CO_2$ is removed through exit port 76. The $Ar/Cl_2$ gas stream exits the sorption bed 74 through exit port 78. The gas is passed through HEPA filters 80 and transported by pump 82 through the $Ar/Cl_2$ blend and recycle line 11 to the chlorination reactor 10.

The shell and tube condenser 66 would recover $1.14\times10^{-2}$ kmol (3.0 kg) of $SnCl_4$ per 100 kg of spent fuel. About 4 g of HEU and 7.7 g of $I_2$ (6.8 g $^{129}I$) would also be recovered. The LLW limit for $^{129}I$ is 0.08 Ci/$m^3$ of waste. Using a liquid $SnCl_4$ density of 2.2 g/$cm^3$ and a specific activity of $1.7\times10^{-4}$ Ci/g for $^{129}I$ yields a loading of 0.86 Ci $^{129}I$ per $m^3$ of $SnCl_4$. This is a factor of 11 too high to qualify as LLW and would require a dilution in cement or some other matrix. Using the dilution factor of 11 yields 15 L of $SnCl_4$ in cement per 100 kg of spent fuel processed. Alternatively, the $I_2$ could be separated from the $SnCl_4$ and immobilized for repository disposal; the quantity of iodine would only be 1.6 $cm^3$ per 100 kg of fuel.

Periodic shut down of the coupled unit operations would occur for batch removal of fission product xenon and krypton gases from carrier gas, for instance by cryogenic distillation. Also periodic shut down would allow transfer of the molten salt to the molten salt regenerator 34. Periodic shut down would allow batch removal of non-radioactive components and uranium from the condensers.

Figure 2:
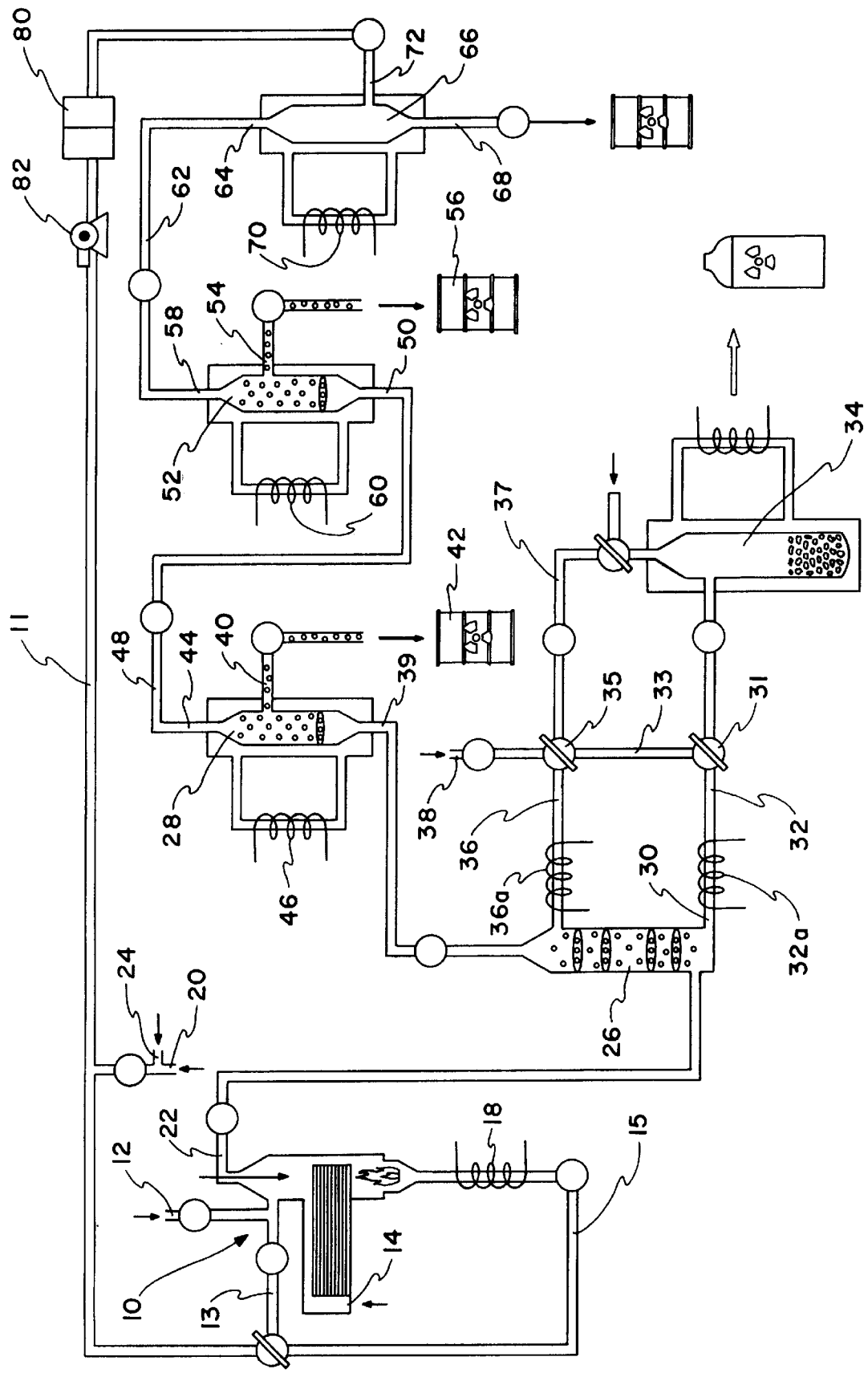
FIG. 2 represents the method as modified for processing stainless steel fuels.

For separating the components of stainless steel fuels, as shown in FIG. 2, essentially the same process would be used. The major difference would be in the waste product from the first fluidized-bed condenser 28. The waste products are $FeCl_3$ and $MoCl_5$. Also the molten salt from the scrubber would not contain $ZrCl_4$ to improve the viscosity. The rest of the method operations are the same.

Figure 3:
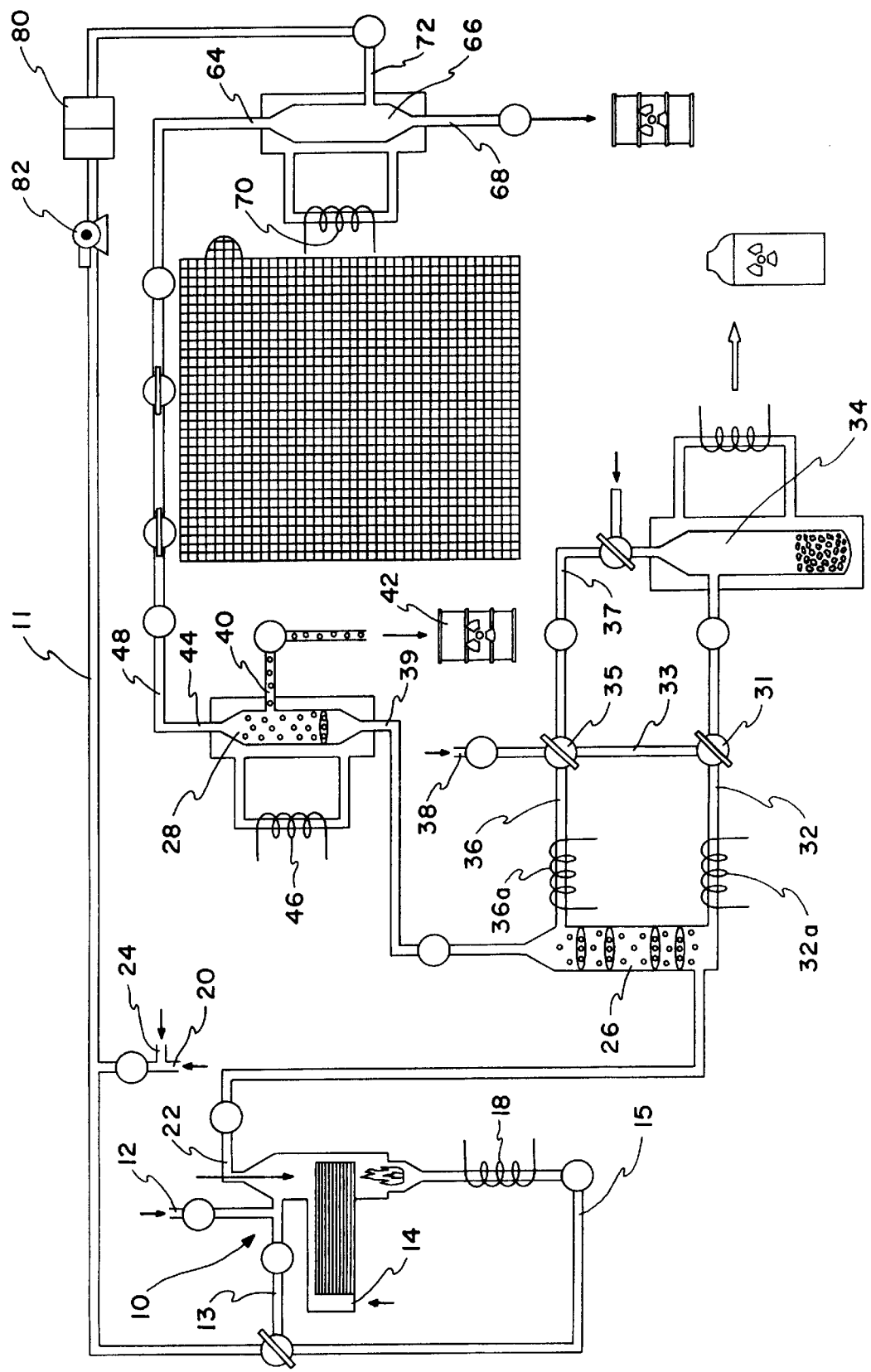
FIG. 3 represents the method as modified for processing aluminum fuels.

For separating the components of aluminum clad fuels, as shown in FIG. 3, only the operation of the first fluidized-bed condenser 28 and the second fluidized-bed condenser 52 would differ from the method for Zircaloy fuels. The waste products of condenser 28 would be $AlCl_3$ and $UCl_6$. The second condenser 52 would not be used.

Although the invention has been described in greatest detail as applied to the separation of the components of Zircaloy fuels, the use of the method has been described for other fuels as well. One skilled in the art would realize the invention applies to the separation of a wide range of radionuclides and not limited to the examples described herein.

Although claims are not required in a Provisional Application, the following are submitted as part of the specification in support of claims that may be filed in any subsequent nonprovisional application for patent.

We claim:

1. A method for separating radionuclides into component products comprising the steps of:
   a) contacting the radionuclides with chlorine gas in a dry reactor to form metal chloride gas;
   b) scrubbing the metal chloride gases to remove fission product chlorides and transuranic chlorides;
   c) condensing the scrubbed gases to remove the remaining metal chlorides;
   d) regenerating and recycling the molten scrubber salts to precipitate the fission product-, and transuranic chlorides; and
   e) vitrifying the fission product and transuranic precipitates.

2. The method of claim 1 wherein the reactor temperature is selected from a range between 1500°–2400° K.

3. The method of claim 1 wherein the reactor temperature is controlled by blending argon gas with the chlorine gas.

4. The method of claim 1 wherein an oxygen scavenger is added to the reactor to prevent the formation of oxychlorides.

5. The method of claim 4 wherein the oxygen scavenger is selected from the group consisting of CO, Mo, $MoCl_5$, Nb, $NbCl_5$, carbon, and unsaturated chlorinated hydrocarbons.

6. The method of claim 1 wherein the scrubber is a molten salt scrubber.

7. The method of claim 1 wherein the molten salt of the scrubber is $ZnCl_2$.

8. The method of claim 1 wherein the components removed from the gases by the scrubber are chlorides of fission products, transuranic products, Ni, and Cr.

9. The method of claim 1 wherein the gases are condensed in a plurality of condensers selected from a group consisting of fluidized bed condensers and tube and shell condensers.

10. The method of claim 1 wherein a first fluidized bed condenser is operated in a temperature range of 425°–450° K.

11. The method of claim 10 wherein the first fluidized bed condenser removes product as selected from the group consisting of $ZrCl_4$ and $FeCl_3$, $FeCl_3$ and $MoCl_5$, and $UCl_6$.

12. The method of claim 10 wherein a second fluidized bed condenser is operated in a temperature range of about 325°–300° K.

13. The method of claim 12 wherein the second condenser removes the $UCl_6$ product.

14. The method of claim 12 wherein a third condenser is a shell and tube scrubber operated in a temperature range of about 275°–250° K.

15. The method of claim 14 wherein the third condenser removes $I_2$ and $SnCl_4$.

16. The method of claim 1 wherein the molten scrubber salts are regenerated by being vaporized to 1000° K. and recycled to the scrubber.

17. The method of claim 1 wherein the precipitates from the molten salt regeneration are reacted with compounds selected to form oxides and fluorides prior to vitrification.

18. The method of claim 2 wherein the blended argon and chlorine gases are purified and recycled to the dry reactor.

19. A dry halide method for separating components of spent nuclear fuels comprising the steps of:
   a) reacting the fuel with chlorine gas, argon gas, and an oxygen scavenger selected from the group of CO, Mo, Nb, carbon, and unsaturated chlorinated hydrocarbons heated to a temperature range of 1500°–2400° K. to form a metallic chloride gas stream;
   b) passing the gas stream through a molten $ZnCl_2$ counter current scrubber to remove fission product, Ni, Cr, and transuranic chlorides;
   c) condensing the gas stream in a first fluidized bed condenser to a temperature range of 450°–425° K. to remove $ZrCl_4$ and $FeCl_3$;
   d) condensing the gas stream in a second fluidized bed condenser to a temperature range of 325°–300° K. to remove $UCl_6$ product;
   e) condensing the gas stream in a tube and shell condenser to a temperature range of 275°–250° K. to remove $I_2$ and $SnCl_4$;
   f) transferring the molten scrubber salts to a regeneration tank;
   g) volatilizing the molten scrubber salts at approximately 1000° K. to precipitate the fission product and transuranic chlorides;
   h) reacting the precipitated fission product and transuranic chlorides with compounds selected to form oxides and fluorides of the precipitates;
   i) vitrifying the reacted fission product and transuranic precipitates.

* * * * *